(12) United States Patent
Trichina et al.

(10) Patent No.: US 8,140,746 B2
(45) Date of Patent: Mar. 20, 2012

(54) INTELLIGENT MEMORY DATA MANAGEMENT

(75) Inventors: Elena Trichina, Munich (DE); Arnaud Boscher, Puteaux (FR)

(73) Assignee: Spansion LLC, Sunnyvale, CA (US)

( * ) Notice: Subject to any disclaimer, the term of this patent is extended or adjusted under 35 U.S.C. 154(b) by 445 days.

(21) Appl. No.: 11/957,226

(22) Filed: Dec. 14, 2007

(65) Prior Publication Data
US 2009/0157948 A1 Jun. 18, 2009

(51) Int. Cl.
*G06F 13/00* (2006.01)
(52) U.S. Cl. .................... 711/112; 711/E12.045
(58) Field of Classification Search .................. None
See application file for complete search history.

(56) References Cited

U.S. PATENT DOCUMENTS

| | | | |
|---|---|---|---|
| 7,366,825 B2 * | 4/2008 | Williams et al. | 711/103 |
| 7,809,898 B1 * | 10/2010 | Kiselev et al. | 711/152 |
| 2002/0069318 A1 * | 6/2002 | Chow et al. | 711/104 |
| 2003/0037248 A1 * | 2/2003 | Launchbury et al. | 713/193 |
| 2003/0140350 A1 * | 7/2003 | Watkins et al. | 725/116 |
| 2005/0235116 A1 * | 10/2005 | Franaszek et al. | 711/137 |
| 2006/0062542 A1 * | 3/2006 | Sakuma | 386/46 |
| 2006/0149902 A1 * | 7/2006 | Yun et al. | 711/118 |
| 2007/0155418 A1 * | 7/2007 | Shau et al. | 455/550.1 |
| 2007/0192534 A1 * | 8/2007 | Hwang et al. | 711/103 |
| 2007/0208719 A1 * | 9/2007 | Tran | 707/3 |
| 2008/0056012 A1 * | 3/2008 | Erez | 365/185.29 |
| 2008/0059692 A1 * | 3/2008 | Erez | 711/103 |
| 2008/0133833 A1 * | 6/2008 | Watanabe | 711/115 |
| 2008/0155275 A1 * | 6/2008 | Natarajan et al. | 713/193 |
| 2008/0208819 A1 * | 8/2008 | Wang et al. | 707/3 |
| 2008/0307156 A1 * | 12/2008 | Sinclair | 711/103 |
| 2009/0164702 A1 * | 6/2009 | Kern | 711/103 |

OTHER PUBLICATIONS

Windows Mobile 5, Released May 9, 2005, http://www.microsoft.com/windowsmobile/en-us/meet/applications/office-outlook-mobile.mspx.*

* cited by examiner

*Primary Examiner* — Pierre-Michel Bataille
*Assistant Examiner* — Sean D Rossiter
(74) *Attorney, Agent, or Firm* — Turocy & Watson, LLP

(57) ABSTRACT

Systems and/or methods that facilitate data management on a memory device are presented. A data management component can log and tag data creating data tags. The data tags can comprise static metadata, dynamic metadata or a combination thereof. The data management component can perform file management to allocate placement of data and data tags to the memory or to erase data from the memory. Allocation and erasure are based in part on the characteristics of the data tags, and can follow embedded rules, an intelligent component or a combination thereof. The data management component can provide a search activity that can utilize the characteristics of the data tags and an intelligent component. The data management component can thereby optimize the useful life, increase operating speed, improve accuracy and precision, improve efficiency of non-volatile (e.g., flash) memory and provide improved functionality to memory devices.

20 Claims, 12 Drawing Sheets

INTELLIGENT MEMORY DATA MANAGEMENT

TECHNICAL FIELD

The subject innovation relates generally to memory systems and in particular to systems and methods that can provide improved memory capability through improved data management.

BACKGROUND

A wide variety of memory devices can be used to maintain and store data and instructions for various computers and similar systems. In particular, non-volatile (e.g., flash) memory is a type of electronic memory media that can be rewritten and that can retain content without consumption of power. Unlike dynamic random access memory (DRAM) devices and static random memory (SRAM) devices in which a single byte can be erased, flash memory devices are typically erased in fixed multi-bit blocks or sectors. Flash memory technology can include NOR flash memory and NAND flash memory, for example. NOR flash memory evolved from electrically erasable read only memory (EEPROM) chip technology, in which, unlike flash memory, a single byte can be erased; and NAND flash memory evolved from DRAM technology. Flash memory devices typically are less expensive and denser as compared to many other memory devices, meaning that flash memory devices can store more data per unit area.

Flash memory has become popular, at least in part, because it combines the advantages of the high density and low cost of EPROM with the electrical erasability of EEPROM. Flash memory is nonvolatile; it can be rewritten and can hold its content without power. The physical structure is more robust against shock than volatile memory and has gained popularity in portable devices. It can be used in many portable electronic products, such as cell phones, portable computers, voice recorders, thumbnail drives and the like, as well as in many larger electronic systems, such as cars, planes, industrial control systems, etc. The fact that flash memory can be rewritten, as well as its retention of data without a power source, small size, and light weight, have all combined to make memory devices, that utilize in part flash memory, useful and popular means for transporting and maintaining data.

Conventionally, memory devices are passive, or limited, in their functionality (e.g., limited to write block, read block, erase block). Memory devices also can have narrow interfaces between the memory device and the host processor, typically a mapping for directory-based file system represented as a file allocation table (FAT) contained in a host fast system memory. The FAT utilizes a file translation layer (FTL) that can translate every request for read or write in a file into a request for read/erase/write in the flash memory cell array. Functional processing of data contained on memory devices suffers from a narrow interface between the operating system (OS) of the host and the memory component. In many cases, the interface can be further narrowed for a number of host devices due to the hosts' limited graphical user interface (e.g., on small portable devices). These constraints of limited functionality and narrow interface make the memory device dependent on the host processor for a large portion of functionality.

Various data is conventionally stored in the memory component in a heterogeneous manner (e.g., without regard to file type or use of data). Conventional access (e.g., through the FAT-FTL based representation) to data stored in the memory component can become cumbersome. Trends regarding memory components include both increased use for a multitude of file types and increased capacity for storage of data items.

The limitations of limited functionality, narrow interface and access to stored data become more pronounced as use becomes more prominent and memory device sizes dramatically increase in size. With the increase in size, electronic devices capture, retain and use more data and more various types of data (e.g., hundreds of kilobytes of system files, files comprising directories and bitmaps, megabyte-size MP3 music files, small text files comprising received and sent SMS and mails, kilobyte-size call logs, various media-rich files, tens of megabytes pixels of pictures, advertising coupons, downloaded time tables, user-created notes and "to do" lists, etc.).

Performance and reliability are also concerns with memory systems (e.g., flash memory systems), as memory can have a limited life span (e.g., an upper limit of times the memory can be accessed, read, written or erased). Techniques have evolved in order to preserve device memory. Conventionally, one technique is known as wear leveling. However, this technique operates without regard to the knowledge of what the data in memory might be (e.g., data type) or its relation to other data in memory. Operating without regard to type and relation of data can result in poor reliability and performance. Data required for a single operation can be located in different portions of the memory, necessitating longer read times. Data can be moved during wear leveling and create fragments. The conventional wear leveling techniques becomes less effective as well with increases in file size, number and diversity.

As the trend for greater use and increased size of memory devices is not seen to diminish, it is desirable to improve the memory devices. It is desirable to increase management efficiency of data stored in memory devices to improve life of the device and add functionality to the memory device.

SUMMARY

This subject innovation presents systems/methods that can facilitate user access to a memory system (e.g., flash memory system) enhancing user experience and at the same time increasing reliability, durability, and performance of the memory system. The subject innovation is based in part on the premise that data can be stored in a memory device in such a way that the data can be managed as a database; access to and management of this database can be controlled by the memory device while the role of host operating system can be in part to present a user with an interactive graphical user interface (GUI). The subject innovation is also based in part on the premise that functionality of an embedded microcontroller in the memory device can be extended from handling only commands which conventionally comprise a narrow memory device interface (e.g., Read byte/Read page, Write page, Erase block) to include handling internally memory organization in an intelligent manner (e.g., suitable for a query-type access); and input/output user interface capability can handle extended interface commands (e.g., queries to search for data).

In accordance with an aspect, a memory component can comprise a memory array that can include a plurality of memory locations (e.g., memory cells) in which data can be stored. To facilitate improved memory performance, the memory component can employ a data management component that can contain a log component, which can receive, generate and/or capture information relating to operations (e.g., read, write, erase) on data associated with the memory component. The log component can capture metadata related to the data entity, which can include static as well as dynamic metadata. Metadata can include information about the data such as, for example, types of data (e.g., pictures, music, text, spreadsheets, calendar or planning data, web pages, etc.), name and size of data, name of data file extension, sensitivity level of data, and date of creation. Metadata can also include information such as, for example, date of last read access and total number of read access to the data, date of last update (write) access and total number of write access to the data. In an embodiment, the data management component can contain an intelligent component, which can create metadata based in part on embedded rules and/or an inference engine. Such metadata can include, for example, sensitivity factors, applications utilizing the data, and relation of data to other data in terms proximity of use, time of use, and/or duration of use.

In accordance with yet another aspect, a data management component can contain a tag component, which can generate tags for the data elements (e.g., received data and logged data) and the tags can be captured with the data. The captured tag data can be written to the memory array. In one aspect, the tag data can be written contiguously with the received data, and in another aspect, the tagged data can be written non-contiguously with the received data. In accordance with an aspect, the tag data can be associated with the received data. In one aspect, the tags can include information received from the log component. In accordance with another aspect, the tags can include information received from an intelligent component.

In yet another aspect of the disclosed subject matter, a data management component can contain a file management component, which can facilitate managing storage of data stored in the memory component based in part on the characteristics of the data and/or data tags, such that, for example, data can be stored contiguously or substantially contiguously and/or can provide for improved prefetch operations. In an aspect, the file management component can utilize tag data indicating, for example, data size and related file locations in the memory array. In another aspect, the managed storage can facilitate improved handling of security data by immediately or substantially immediately indicating which memory locations should be erased or over written first to remove outdated sensitive information. In yet another aspect, the improved storage management can improve wear-leveling operations by identifying "hot" and/or "cold" files and allocating these files to appropriate memory locations based in part on the level of wear of memory locations in the memory array.

In accordance with an aspect, the data management component can contain a search component, which, for example, can include indexing of data tags to provide for the data to be queried based in part on the index. In another aspect, the search component can receive search terms from the user interface and can utilize an intelligent component that can employ embedded rules and/or inference to facilitate retrieving results from the memory array. In an aspect, the results can include options to revise the input search terms or terminate the search.

The features of the disclosed subject matter can facilitate increased operating speed, improved accuracy, precision, and/or efficiency of, and/or can provide new and/or improved functionality to, memory devices.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
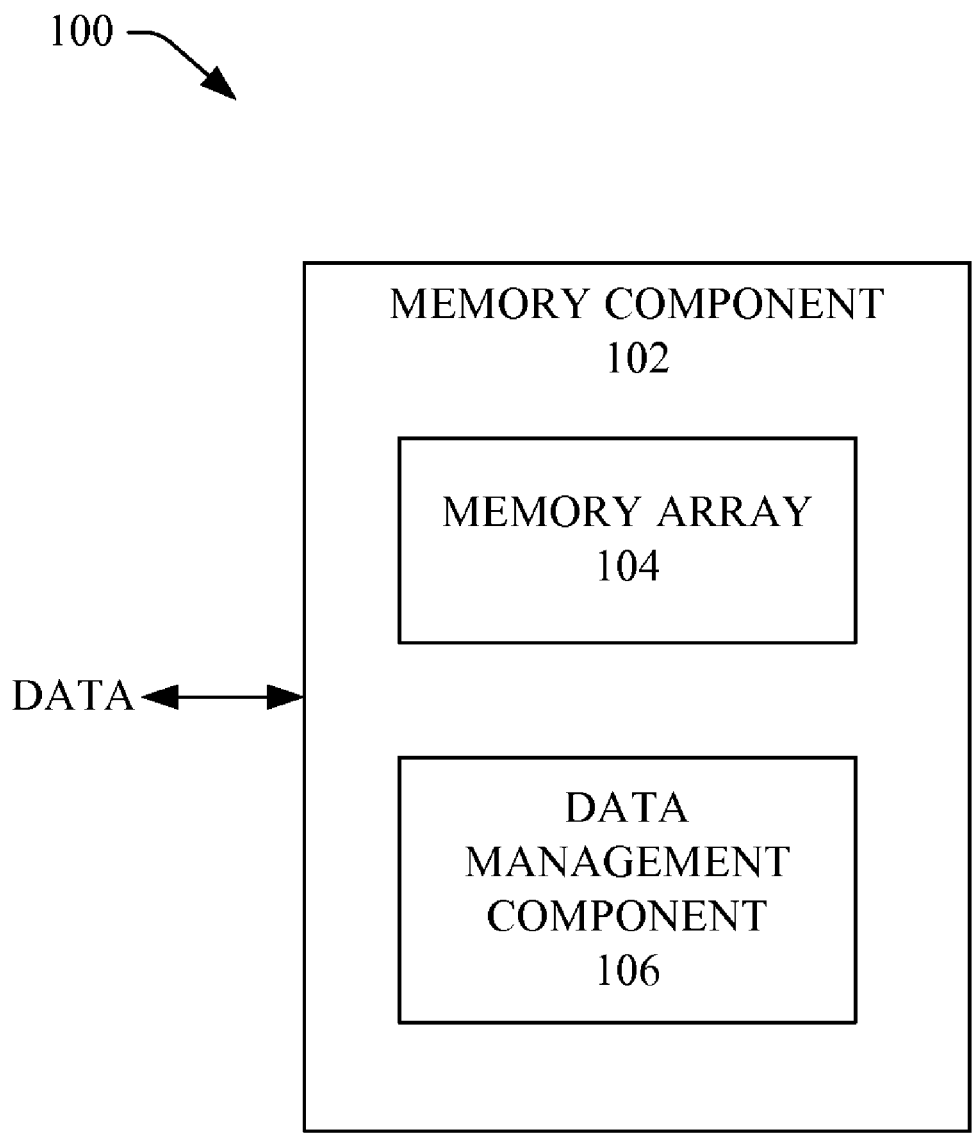
FIG. 1 illustrates a block diagram of a system that can facilitate data management associated with a memory component in accordance with an aspect of the subject matter disclosed herein.

The disclosed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the disclosed subject matter may be practiced without these specific details. In other instances, well-known structures and devices are shown in block diagram form in order to facilitate describing the subject innovation.

Memory devices (e.g., flash memory) have seen improvements in size and can be used in many portable electronic products, such as cell phones, portable computers, voice recorders, thumbnail drives and the like, as well as in many larger electronic systems, such as cars, planes, industrial control systems, etc. The diversity of devices that use memory creates a diversity of types of data that are put into memory.

Examples of such data for a mobile phone application are: text, pictures, music, ring tones, books, multimedia from pc/internet, data related to professional activities, phonebook and user info data secondary data for transactions (e.g., confirmation number for pc order). Conventional functionality of memory components can be limited in functionality. Concurrently, the large variety of interfacing applications can drive the interface between a host operating system and the memory component to be limited.

Systems and methods that can facilitate improved and/or increased functionality and/or performance of memory devices/systems are presented. A memory component can comprise a data management component. The data management component can comprise a log component can log information related to operations (e.g., read, write, erase) on data associated with the memory component to facilitate tracking data usage, and/or identifying and/or grouping respective pieces of data associated with the memory component. The log information can comprise static metadata, dynamic metadata or a combination thereof. The data management component can also comprise a tag component that can create data tags to facilitate identifying and/or grouping respective pieces of data associated with the memory component. The data management component can further comprise a file management component that can facilitate allocation of placement of data and data tags in the memory or that can facilitate erasure of data from the memory. Allocation and erasure can be based in part on the characteristics of the data tags, embedded rules, and/or inferences associated with the data. The data management component can provide a search activity utilizing the characteristics of the data tags and can utilize an intelligent component. The data management component can thereby optimize the useful life, increase operating speed, improve accuracy and precision and provide new functionality to memory devices.

Turning to the figures, FIG. 1 illustrates a system 100 that can facilitate data management associated with a memory in accordance with an aspect of the disclosed subject matter. System 100 can contain a memory component 102 that can facilitate storage of data and instructions written in code. The memory component 102 can comprise nonvolatile memory and/or volatile memory. The nonvolatile memory can include, for example, flash memory (e.g., single-bit flash memory, multi-bit flash memory), mask-programmed ROM, programmable ROM (PROM), Erasable PROM (EPROM), Ultra Violet (UV)-erase EPROM, one-time programmable ROM, electrically erasable PROM (EEPROM, and/or nonvolatile RAM (e.g., ferroelectric RAM (FeRAM)). The volatile memory can include, for example, RAM, static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and/or Rambus dynamic RAM (RDRAM).

Memory component 102 can include a memory array 104 (e.g., nonvolatile memory array) that can be composed of various memory schema (e.g., configurations of NOR flash and/or NAND flash) that can receive and store data. The memory array 104 can include a plurality of memory cells (not shown) wherein each memory cell can store one or more bits of data. Data stored in a memory cell(s) in the memory array 104 can also be read and such data can be provided as an output. System 100 can also include a volatile memory component (not shown) (e.g., buffer component), which can be a configured in a random access manner (e.g., SRAM or DRAM) and can facilitate the transmission of data to or from the nonvolatile memory of memory component 102.

In accordance with one aspect, memory component 102 can comprise a data management component 106. In one aspect the data management component 106 can provide management of the data encoded in the memory array 104. Data management component 106 can assist in allocating files of similar nature or related use to be placed together in the same or contiguous blocks, or substantially contiguous blocks, of memory array 104, which can facilitate improving read performance (e.g., can increase the speed of performing read operations).

In another aspect, data management component 106 can identify and treat sensitive data in a more desired manner. Conventional memory handling treats sensitive data the same as other data by merely marking such sensitive data as "dirty" and available for being overwritten. The sensitive data can physically remain in the memory array 104 until the erase block that contains at least some pages marked as "dirty" is eventually physically erased by a wear leveling mechanism. Data marked as "dirty" can be stored throughout a memory array 104. Conventional wear leveling mechanisms do not prioritize which marked areas are overwritten first. It is thus conceivable that a marked sensitive data on the data array 104 can retain sensitive data for prolonged periods of time, perhaps with some of the sensitive data never even being erased. Data management component 106 can prioritize and ensure that the sensitive data is erased immediately or substantially immediately.

In another aspect, data management component 106 can improve on the durability of the memory component 102 by improving wear-leveling techniques. Wear leveling is a technique to distribute the read/write/erase actions on a memory component 102 in order to not use any one particular section (e.g., memory location(s), blocks) of the memory array 104 more often than another and/or to control those sections which have had more extensive use and thus can be more prone to failure. Conventionally, this is completed without regard to the type of data or the relation of one data item to any other data item. In accordance with an aspect of the disclosed subject matter, the data management component 106 can improve the application of wear leveling by managing allocation of data taking into account characteristics of data (e.g., as captured in data tags), such that wear leveling can be performed based in part on the tags associated with respective pieces of data. In a non-limiting example regarding calendar data, the data management component 106 can facilitate tagging data based in part on whether a calendar event is upcoming or has already occurred. Based in part on the tag data respectively associated with calendar events, the data management component 106 can allocate placement of meeting data that has occurred and that has not been accessed in some time in the more worn areas of memory array 104 while placing forthcoming meetings in the less used areas of memory array 104. Such action can provide a smart allocation and placement of data in the memory array 104 that can facilitate extending the functional life of the memory component 102.

Figure 2:
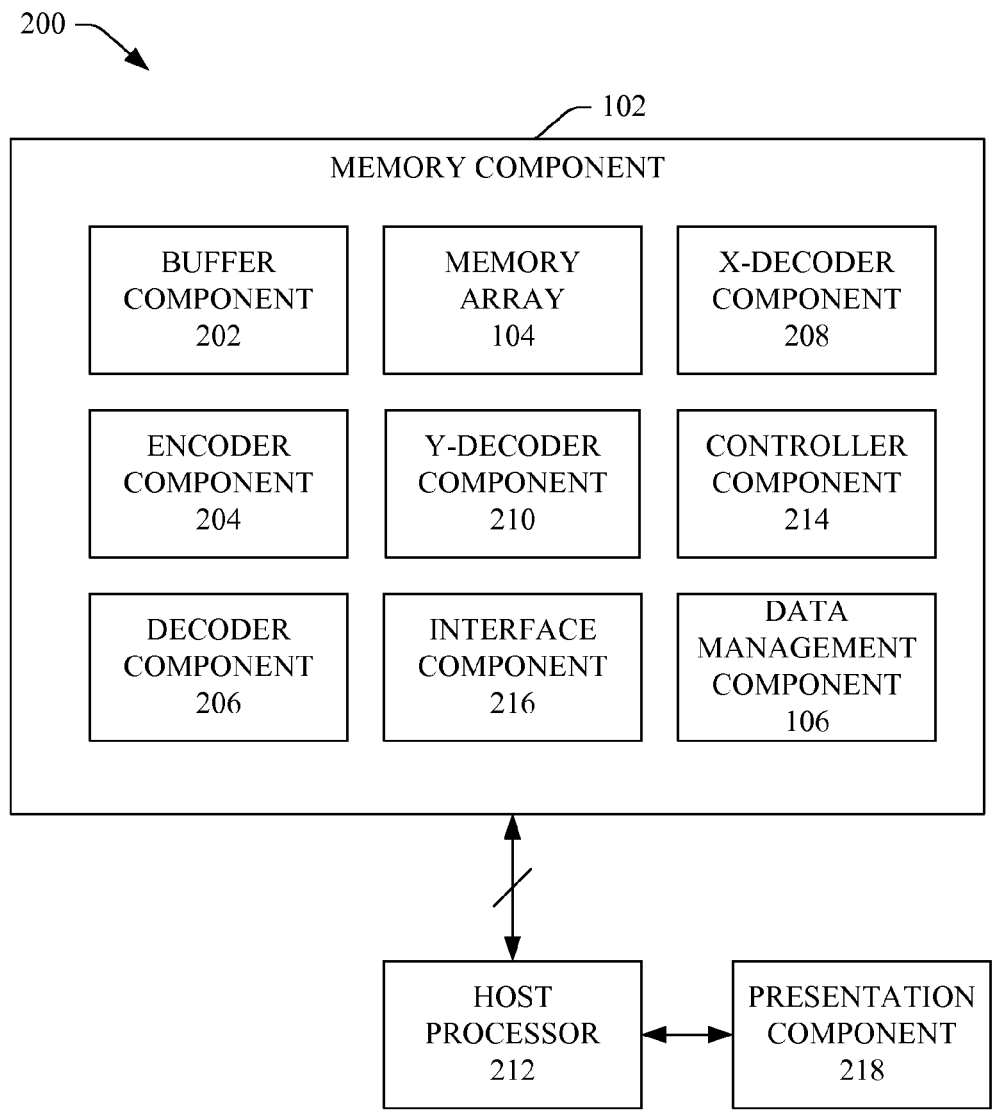
FIG. 2 depicts a block diagram of another system that facilitates access and data management in accordance with aspects of the disclosed subject matter.

Turning to FIG. 2, depicted is a system 200 that can facilitate intelligent data management for a memory in accordance with an aspect of the disclosed subject matter. System 200 can contain a memory component 102 that can facilitate storage of data and instructions written in code. Memory component 102 can include a memory array 104 that can be composed of various memory schema (e.g., configurations of NOR flash and/or NAND flash) that can receive and store data. The memory array 104 can include a plurality of memory cells (not shown) wherein each memory cell can store one or more bits of data. Data stored in a memory cell(s) in the memory array 104 can also be read and such data can be provided as an output. The memory component 102 can contain a data management component 106, which can provide management of the data stored in the memory array 104 as described herein. The memory component 102, memory array 104, and data management component 106 each can be the same or similar as, and/or can comprise the same or similar functionality as, respective components as more fully described herein, for example, with regard to system 100.

System 200 can also include a buffer component 202, which can be a configured in a random access manner (e.g., SRAM or DRAM) and can facilitate the transmission of data to or from the nonvolatile memory of memory component 102.

The memory component 102 can include an encoder component 204 that can facilitate encoding data being programmed to the memory component 102. For example, the encoder component 204 can facilitate converting a digital signal to an analog signal (e.g. current level) to facilitate programming data in the memory locations (e.g., memory cells) in the memory component 102.

The memory component 102 can further include a decoder component 206 that can facilitate decoding data being read from the memory component 102. The decoder component 206 can receive an analog signal associated with data, where the analog signal can be stored in the memory location in the memory array 104, and can facilitate converting the analog signal to a digital signal, so that such digital signal representing the read data can be provided to another component (e.g., data management component 106) for further processing.

The memory component 102 can include an X-decoder component 208 and a Y-decoder component 210 that can be associated with the memory array 104 and can each respectively decode inputs/outputs during various operations (e.g., programming, reading, verifying, erasing) that can be performed in the memory cells (not shown), as more fully described herein. For example, the X-decoder component 208 and Y-decoder component 210 can each receive address bus information, which can be provided as part of a command from the host processor 212 or a command from a controller component 214 within the memory component 102, and such information can be utilized to facilitate determining the desired memory location in the memory component 102.

System 200 can also include a host processor 212 that can be associated with the memory component 102. In accordance with an embodiment of the disclosed subject matter, the host processor 212 can be a typical applications processor that can manage communications and run applications. For example, the host processor 212 can be a processor that can be utilized by a computer, a mobile handset, personal data assistant (PDA), or other electronic device. The host processor 212 can generate commands, including read, write, and/or erase commands, in order to facilitate reading data from, writing data to, and/or erasing data from the memory component 102, where the communication of information between the host processor 212 and the memory component 102 can be facilitated via an interface component 216 (hereinafter also referred to as "I/F 216").

System 200 can further include a controller component 214 within the memory component 102. The controller component 214 can facilitate control of access to memory and data, data management (e.g., handling internal memory organization) and extended interface commands (e.g., query commands).

I/F 216 can include and/or provide various adapters, connectors, channels, communication paths, etc. to integrate the memory component 102 into virtually any operating and/or database system(s) and/or with one another system(s). In addition, I/F 216 can provide various adapters, connectors, channels, communication paths, etc., that can provide for interaction and/or communication with the host processor 212, and/or any other component, data, and the like, associated with the system 200.

System 200 also can include a presentation component 218, which can be associated with the host processor 212. The presentation component 218 can provide various types of user interfaces to facilitate interaction between a user and any component coupled to the host processor 212. As depicted, the presentation component 218 is a separate entity that can be utilized with the host processor 212 and associated components. However, it is to be appreciated that the presentation component 218 and/or similar view components can be incorporated into the host processor 212 and/or a stand-alone unit. The presentation component 218 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled to and/or incorporated into the host processor 212. The user can also interact with the regions to select and provide information via various devices such as a mouse, a roller ball, a keypad, a keyboard, a pen and/or voice activation, for example. Typically, a mechanism such as a push button or the enter key on the keyboard can be employed to facilitate entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alphanumeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Figure 3:
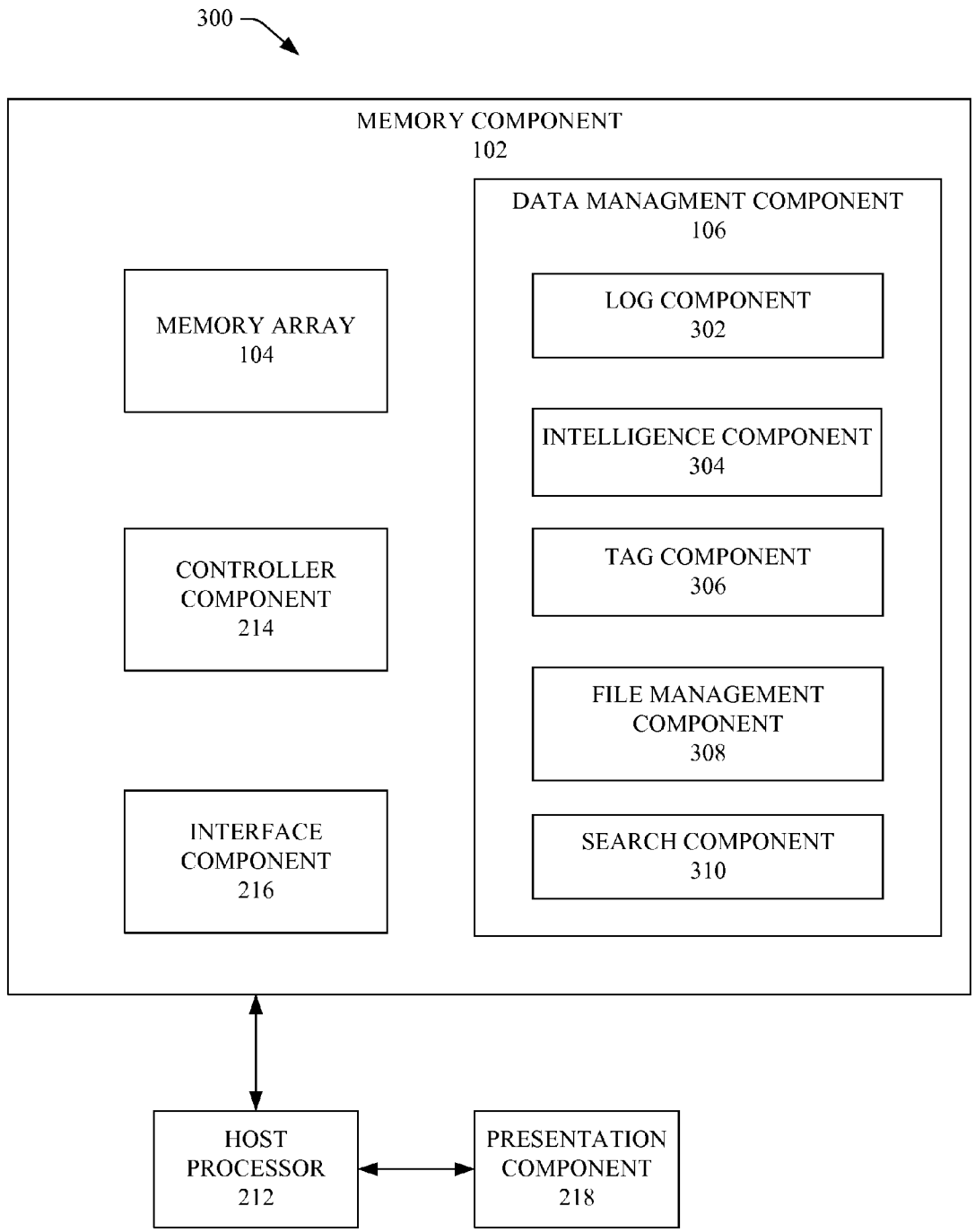
FIG. 3 is a block diagram depicting a system that can facilitate access of information and data management associated with a memory component in accordance with aspects of the subject matter disclosed herein.

Turning to FIG. 3, depicted is a system 300 that can manage data on memory component in accordance with an aspect of the disclosed subject matter. System 300 can contain a memory component 102 that can facilitate storage of data and instructions written in code. Memory component 102 can include a memory array 104 that can be composed of various memory schema (e.g., configurations of NOR flash and/or NAND flash) that can receive and store data. The memory array 104 can include a plurality of memory cells (not shown) wherein each memory cell can store one or more bits of data. Data stored in a memory cell(s) in the memory array 104 can also be read and such data can be provided as an output. The memory component 102 can contain a data management component 106, which can provide management of the data stored in the memory array 104 as described herein. The memory component 102, memory array 104, and data management component 106 each can be the same or similar as, and/or can comprise the same or similar functionality as, respective components as more fully described herein, for example, with regard to system 100 and/or system 200.

In one aspect, the data management component can comprise a log component 302 that can log information associated with data associated with the memory component 102. The log component 302 can capture information associated with the incoming and outgoing data associated with the memory component 102, which can be static (e.g., unchanging) or dynamic (e.g., changing) in nature. Static information can be information that is not likely to change, such as type of data (e.g., pictures, music, text, spreadsheets, web pages), name of the data, date of creation, size of the data, and other information characterizing the data. Dynamic information can be information that is likely to change, such as the date of last read access to the data, date of last update (e.g., write) access to the data, number of read access to the data (e.g., how "hot" or "cold" the data are), number of write access to the data (e.g., the number of times the data is revised) and which other data are typically accessed with these data. The information about the data is called metadata. The data set can include a captured or generated name. A naming convention (e.g., a serial identifier) can be generated and linked to a captured name (e.g., user provided name of data) if so provided by the host processor 212).

In one aspect, the data management component 106 can include an intelligent component 304 that can be employed to facilitate determining such data as probability of other data being accessed in near term times (e.g., pseudo-group). Intelligent component 304 can be employed in connection with assignments with extrinsic information (e.g., environmental factors, preferences, historical information). In accordance with an aspect, the intelligent component 304 can employ artificial intelligence techniques to facilitate automatically performing various aspects (e.g., analyzing resources, extrinsic information, preferences) as described herein. Moreover, intelligence-based schemes can be employed to facilitate inferring intended actions to be performed at a given time and state. The intelligence-based aspects of the subject innovation can be affected via any suitable machine learning based technique and/or statistical-based techniques and/or probabilistic-based techniques. For example, the use of expert systems, fuzzy logic, support vector machines (SVMs), Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, etc. are contemplated.

In an aspect, the log component 302 can capture sensitivity characteristics of the information associated with the memory component 102. The sensitivity characteristics can be based in part on predetermined sensitivity criteria, which for example can be based in part on such factors as cryptographic rules, a level(s) of authorization, a user specification and/or an association with particular applications, or the sensitivity characteristics can be based in part information (e.g., inferences, rules-based information) provided by the intelligent component 304.

In yet another aspect, the data management component can comprise a tag component 306 that can utilize information captured from the log component 302 (and/or the intelligent component 304) and can create a tag(s), which can be associated with the incoming data or existing data based in part on the logged information (and/or intelligence information) respectively associated with the data. One or more tags can index each data file, which can be stored in the memory array 104. In an aspect, data tags can be completed in a consistent manner such that file management tasks are enabled and/or facilitated. In an aspect, the data management component 106 can also contain a file management component 308 can utilize the captured information to improve memory performance and can collocate similar group files for increased speed (e.g., read performance speed), and can optimally allocate placement of data files in the memory array 104 based in part on type and use characteristics of the data (e.g., based in part on the tag information). In one such aspect, tag information as to the size of the data can be recorded in a specific position of the data record. This can facilitate enabling a prefetch operation to move to the proper point of data records being read in a more efficient manner.

In another aspect, the data management component can comprise a file management component 308 that can determine the allocation of data to be placed (e.g., written) in the memory array 104, based in part on the tags from the tag component 306. In one aspect, the file management component 308 can operate independent of the host processor 212 to facilitate managing files associated with the memory component 102. In one aspect, data can be placed in a memory array 104 in a desired order, e.g., contiguous or as otherwise desired based in part on the characteristics of data, such as contained in the data tags. In one aspect, file management component 308 can access the intelligent component 304 for an inferential logic, and/or pre-ordained policies (e.g., predetermined rules) for optimal placing of files in the memory array 104.

In an aspect, the file management component 308 can efficiently allocate data storage locations in the memory array 104 based in part on the number of read accesses to a particular file (e.g., which can be a measure of how "hot" the file is). Relatively unused or "cold" files can be copied during reclamation (e.g., garbage collection) scans of the memory component 102 into "low quality" erase blocks of the memory array 104 (e.g., erase blocks that have been many times erased and/or are potentially close to the end of their lifetime, and/or erase blocks that have a predetermined number of data errors associated therewith). In this aspect, pages comprising a "hot" file can be allocated to be stored by file management component 308 into sequential or substantially sequential high quality (e.g., low-error, less worn) pages in erase blocks of the memory array 104.

In an aspect, the tag component 306 can generate tags from a calendar file data in a manner that relates to use levels. Calendar files corresponding to upcoming days can be accessed more frequently (in read mode) than those for passed days; and they can be most likely accessed for writes, as compared to calendar files of passed days. The file management component 308 can allocate the data based in part on the tags associated with the data (e.g., calendar files), which can tag the different files of the calendar information. The allocation can be such that files for future days can have faster access than those for past days; also the files can be organized in a log-structure to facilitate various write updates without erasing the whole file. In another aspect of the file management component 308, unused/little used files can be compressed saving room in the memory array. When the date approaches, the file management component 308 can utilize the tag data and can "compress" the data by marking outdated versions of the file as dirty and thus ready to be removed, while combining all remaining valid entries into a set of sequential pages in one sector. In an aspect, allocation of data files whose data tags indicate a lower likelihood of updates (e.g., files with tags corresponding to past time periods, birthday information in a calendar function, as birthdays are not likely to change) can be stored in some specific memory location (e.g., with less cycling operations remaining), as past appointments typically do not need to be changed, and there can be less write activity for these files.

In one embodiment, file management component 308 can include consideration of data contiguity when allocating the placement of data in the memory array 104 and thus can greatly reduce data fragmentation. Conventionally, writing (and re-writing) data to memory is done heterogeneously. As memory devices have limited life spans and cannot be rewritten to indefinitely, conventional techniques (e.g., wear-leveling) attempt to utilize the entire memory array evenly and write data to disparate portions of the memory array 104, potentially splitting associated data (e.g., song files, video files, etc.) into different pages of different blocks. This can result in fragmentation of incoming data, as there is no requirement to keep the data contiguous. This can be aggravated over time as wear leveling can move data into different areas to balance the load on the memory array 104. In conventional wear leveling, data can be allocated on size and available page space. Incoming data is placed without regard to the type of data (e.g., file type, or proximity or frequency of use). Fragmentation of files can result in longer load times for the Read function. In accordance with one aspect, the subject innovation can facilitate contiguous or substantially contiguous placement of files in the memory array 104 which can facilitate reducing data fragmentation and the inherent excess cycling when employing the erase command on such fragmented memory arrays due to extra copying, associated with conventional memory systems.

In a non-limiting example, data associated with a song (e.g., MP3 music file) can be written to a memory location(s) in the memory array 104. In accordance with an aspect, the tag component 306 can tag the incoming data as a music file based in part on an extension (e.g., MP3 extension) associated with the data and/or can subsequently update the tag information to associate respective pieces of data in the music file which can be stored in different memory locations in the memory array 104, based in part on the concurrent accessing of such respective pieces of data. The file management component 308 can be made to facilitate boost read mode by placing all pages of an individual MP3 file in a desired order, such as in a contiguous or substantially contiguous order, in the memory array 104.

In yet another aspect, the file management component 308 can utilize appropriately tagged sensitive data (e.g., tagged by tag component 306) to ensure that these data can be erased immediately or substantially immediately as soon as they are tagged (e.g., marked) as deleted sensitive data.

Figure 4:
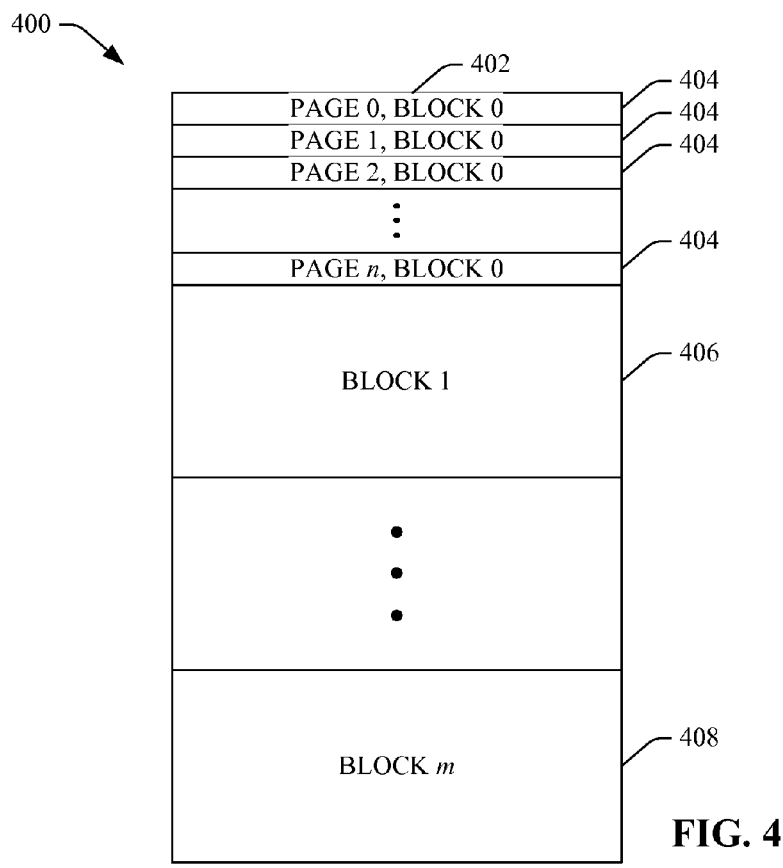
FIG. 4 depicts an example diagram of a memory array in accordance with the disclosed subject matter.

Turning briefly to FIG. 4, depicted is a diagram of a system 400 that facilitates storage of data in accordance with an aspect of the disclosed subject matter. System 400 can depict a representation of the data structure of memory array 104 (not depicted in its entirety). The memory portion 402 can comprise multiple blocks and pages. Memory portion 402 can be comprised of multiple blocks, Block 0 (404) to Block m (408). Block 0 (404) can be comprised of multiple pages, Page 0 to Page n. Continuing with the non-limiting example of data associated with a song, the contiguous or substantially contiguous placement of data by the file management component 308 can be depicted as placement (e.g., writing) of the data in the memory array 104 in subsequent or substantially subsequent order of pages 0 through n, in a block 404, and, if data size requires, to span contiguous blocks 404, 406 through 408 in subsequent order.

Returning to FIG. 3, file management component 308 can facilitate access of files associated with the memory array 104. Continuing with the non-limiting example of data associated with a song, access of music can be requested in the form of a play list and/or an individual song. File management component 308 can facilitate writing data associated with a song file (or multiple song files) in contiguous or substantially contiguous memory location(s) in a memory array 104, where, for instance, the respective pieces of data associated with the song file each can be tagged as associated with the other respective pieces of data of the music (e.g., tagged as associated media). The pieces of data associated with the music file can be tagged to be associated with each other upon an initial write to the memory array 104 (e.g., based in part on information that demonstrates a relationship between the pieces of data, such as file extension information, metadata associated therewith, etc.) or can be tagged subsequently based in part on information demonstrating a concurrent access(es) of the same pieces of data and/or other information (e.g., file extension, metadata associated therewith, etc.). As a result, if a play list or song(s) is requested, the music files can be accessed faster in a boost read mode based in part on the tag information, which can facilitate contiguous or substantially contiguous memory location(s), or other desired data placement, for example.

In an aspect, the erase operation can be more efficient with the desired placement of data (e.g., contiguous or substantially contiguous data placement) provided for by the file management component 308 through the use of tags generated by the tag component 306. For example, if a particular MP3 file is desired to be deleted by the user, and the file management component 308 can locate the data through the data tag indicating characteristics of the data (e.g., file type MP3, song title). In this example, the file management component 308 has placed the data contiguously. The erase function can erase more simply the contiguous memory locations rather than search and erase data from multiple scattered memory locations in the memory array 104. Such contiguous or substantially contiguous placement of associated data (e.g., media files) can provide increased efficiency by maintaining larger blocks and pages of available space for rewrites and/or new data input.

In an embodiment, the data management component 106 can comprise a search component 310 that can provide an expanded functionality to the memory component 102. In one aspect, the search component 310 can facilitate providing to a presentation component 218 an option for the user to engage in a database like query directly with the memory component 102. This increased functionality of the memory component 102 can be desired as memory (e.g., flash memory) capacities continue to increase. With continued growth in memory capacity, the amount of time to access data stored in a mass storage on embedded devices with limited graphical user interface can become lengthier than desired. Conventionally, to find a certain data file among large amounts of stored data (e.g., multi-gigabytes of data) on a hand-held device can be an issue due in part to a small screen which can display only a very limited amount of information (e.g., relatively short lists of directories and within a directory a short list with truncated file names). In conventional devices, the limited capability is often not sufficient for a human user to identify a desired file quickly.

Conventional storage of data to a memory can be illustrated for a mobile device such as a cell phone, in which the user-created files (e.g., pictures, downloaded music, saved SMS and mails, etc.) are initially stored in a typical linear order where linearity is imposed often by a date of creation, in the application-specific (e.g., defined by the host operating system) directory. Conventional wear leveling techniques can move the data to other locations in the memory array based on availability (e.g., the data is spread out so that locations in the memory array have somewhat equal use and distribution of data). The host operating system typically creates a mapping for a directory-based file system represented as a file allocation table (FAT) contained in the host fast system memory. The FAT utilizes a file translation layer (FTL) that translates every request for read or write in a file into a request for read/erase/write in the memory cell array. To access data in conventional memory, one has to know the name of the data (or one identifier). However, with the increasing memory density prompting greater storage of more numerous files, it can be more difficult for a user to remember the names of the different files. Thus, to find a certain file, the user will have to keep "scrolling" first through system directories, until a desired subdirectory is shown on a screen, after which the user keeps scrolling through the files in the subdirectory (often looking them up just to discover that a selection is not the desired file) until the desired file is found.

With regard to the system 300, the search component 310 can utilize tags created by the tag component 306 to facilitate providing results to the user in response to a query(ies) by the user based in part on the tag information respectively associated with respective pieces of data stored in the memory array 104 of the memory component 102. In an aspect, retrieving data from memory can be performed in a way that can mimic access to a database wherein the tag data can represent the index of the database.

In one aspect, the user can make a request to access a particular type of data, without knowing precisely the name of the file, but with knowledge of some particular properties of the considered data. An input/output link can be established between memory component 102 and a presentation component 218 through a host processor 212. Search component 310 can present an option to engage a search through presentation component 218. A user search request can be received by the data management component 106 in memory component 102. Search component 310 can present a set of detailed search options through presentation component 218. In one aspect, search options can include file names, key words, or time frames. In another aspect, inferred characteristics related to the data that the user is searching for can be supplied. Through presentation component 218 and controller component 214, receipt of user input search terms can be captured. Search component 310 can determine results. In one aspect, search component 310 can utilize the tags generated by tag component 306 to match the search terms and return results. In another aspect, search results can be obtained by utilizing intelligent component 304 to retrieve a list of possible matches to the search inquiry. The results of the search can be output to the user (e.g., through a presentation component 218).

In an aspect, the user can accept the list of results and choose from the list, modify the search or cancel the search. The search component 310 can capture the choice of the user and can evaluate the response. If the response to the provided list is a particular selection, the data can be provided by the search component 310 through the presentation component 218. If the response to the provided list is a cancellation of the search, the search component 310 can terminate the search. If the response to the provided list is a request to modify the search, the search component 310 can re-present a set of detailed search options, can receive the modified search input terms and can again undertake a search of the data in the memory array 104 of the memory component 102. Thus the user finds the right file in the list, without knowing the name of the file at the beginning of the search. The option for specifying file name or parts thereof, key words, date ranges and/or the like provides for the user to more rapidly find information in the memory component 102.

The following is a non-limiting example wherein several aspects of system 300 are provided. In this example, a mobile phone device with calendar functioning can represent the host processor 212. The presentation component 218 of the device can include a small touch screen as well as a keypad for data entry. The memory component 102 can contain a memory array 104 composed of non-volatile (e.g., flash) memory and a buffer component 202 composed of volatile memory, for example. The calendar function can provide for entry of important events such as birthdays and business meetings. The host processor 212 through the presentation component 218 can process a request to write data to the memory component 102, and can enter data into the memory component 102 via the presentation component 218 (e.g., a user can input data via the presentation component 218). The data management component 106 can receive, scan, and/or parse the received information, and the log component 302 can log data related to the received data to capture the static and dynamic metadata (e.g., the data can be related to a calendar function and can be comprised of relatively non-changing data such as birthdays and changing data such as an upcoming business meeting) associated with the received data, and can access the intelligent component 304 for an inferential logic, and/or pre-ordained policies (e.g., predetermined rules) for logging characteristics of the data (e.g., data is of sensitive nature).

The tag component 306 can take the log data and can access the intelligent component 304 for an inferential logic, and/or pre-ordained policies (e.g., predetermined rules) and can create data tags that can be respectively associated with the data and its corresponding log data. The tag component can create one or more tags that can index each data file. In the continuing example, data tags can indicate data to be a meeting, a time, a place, a project, a birthday, etc. Meeting characteristics of a sensitive nature can be tagged appropriately.

The file management component 308 can perform file management of the received data to optimize the storage and recall of such data, and can access the intelligent component 304 for an inferential logic, and/or pre-ordained policies (e.g., predetermined rules) for optimal placing of files in the memory array 104. File management component 308 can utilize tags to improve memory performance and can collocate similar group files for increased speed, and can optimally allocate placement of data files in the memory array 104 according to, for example, type and use characteristics of the data. In one aspect, the file management component 308 can operate independent of the host processor 212. For instance, over time, certain phone numbers typically can be utilized more often and certain other numbers can be utilized less frequently. The memory component 102 can utilize the data management component 106, including the tag component 306, and the controller component 214 to facilitate creating and/or updating tag data, and to control data management in the memory component 102, independent of the host processor 212. The tag component 306 of the memory component 102 can update the tag data and the file management component 308 can manage the file locations of the data on the memory array 104 to place the non-changing data in the more worn portions of the memory array 104. The data concerning the upcoming meeting, which can include meeting participants and their phone numbers can be stored in more robust portion of the memory array 104. Furthermore, particular data about the meeting can be stored in contiguous or non-contiguous portions of the memory array 104 based on inferential logic, and/or pre-ordained policies (e.g., predetermined rules). Data characterized by data tags indicating a sensitive nature can be placed in a secure portion of memory component 102.

Once the meeting has occurred and activity related to the meeting diminishes, the tag data for various aspects of the data can be updated via the tag component 306, where the tag component 306 can tag data based in part on information associated with meeting logged by the log component 302 at the time the data is received or subsequent thereto. The management of the data via the file management component 308 can utilize the tag data to appropriately file the data. File management component 308 can operate independent of the host processor 212.

In a continuing example, the user can wish to recall an event from some business meeting, but only recalls that the event happened in August of last year and involved his work on a special project. The user can initiate a query directly to the memory component 102 and can receive a query menu through the presentation component 218. Search component 310 can locate data based in part on data tags. Entering the time frame and subject into the presentation component 218, which can be received by the memory component 102, the search component 310 can facilitate performing a search and can return a list of meetings from last August concerned with the special project. The user can select a modified search option and can key in an additional term (e.g., that the meeting was in Texas). The search component 310 can return a revised search list and the user can select the item from the search results and finds the meeting data containing the bank and phone number of the contact with which the user wishes to correspond.

Continuing with the example, the user has completed his work with the contact and would like to update an account with which the contact is connected. Realizing that his password to the account should be updated periodically the user through the presentation component 218 can instruct that the old account information to be deleted. File management component 308 through the creation and update of tags provided by the tag component 306 can prioritize the erasure of such old account information from the memory array 104 to facilitate an efficient and secure erasure of the sensitive information (e.g., the old account information) independent of the host processor 212.

In another non-limiting example, the memory component 102 can receive (e.g., through a presentation component 218) the following user input: "Find an mp3 file which I have read more than 10 times". The search component 310 can search in the memory array 104 of the memory component 102 for tags of mp3 type and can provide a list of those mp3 files which have been read more than 10 times to the user.

Figure 5:
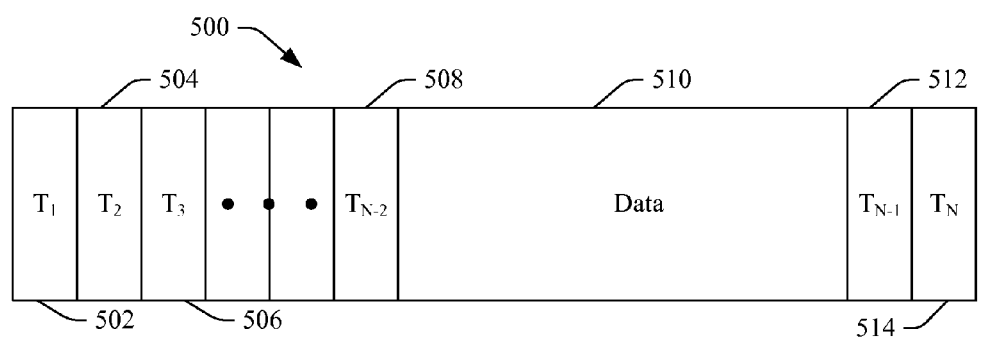
FIG. 5 is a block diagram depicting a data chunk and associated information in accordance with an aspect of the subject matter disclosed herein.

Turning to FIG. 5, illustrated is a block diagram 500 of a data chunk and associated tag information in accordance with the disclosed subject matter. Block diagram 500 can include a data chunk 510 that can be comprised of bits of data. Data chunk 510 can be associated with various tags 502, 504, 506, 508, 512, and 514 that can be generated based on the bits of data in the data chunk 510, the log data, other metadata or the results of the intelligent component 304. In an embodiment, the tag slices can be pictured as a multi-level memory map, with one level related to file structure, another layer to physical feature structure (e.g., free, erased, written) and an intermediate layer which bridges the physical or logical memory maps. In an embodiment of the present disclosure, the data mapping as seen by the host can be not affected by the additional tag data associated with the data record.

Figure 6:
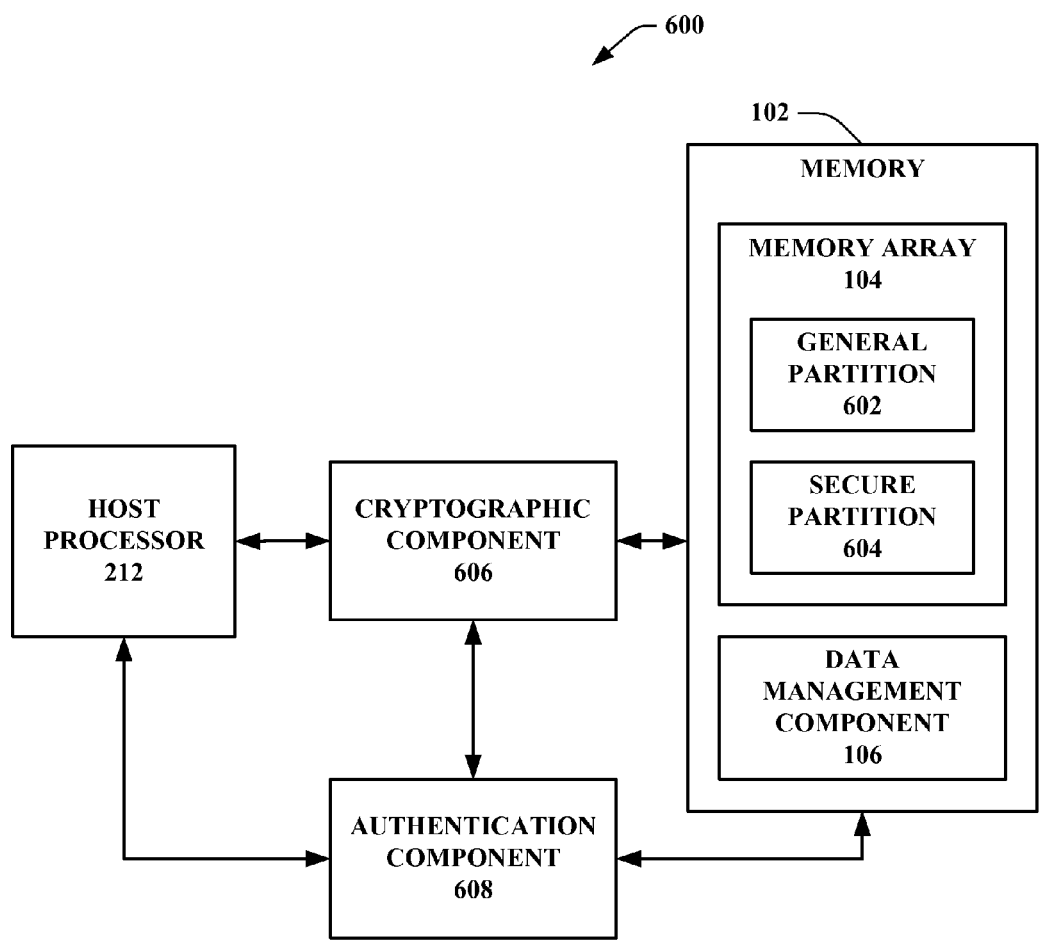
FIG. 6 illustrates a block diagram of a system that facilitates data management of secure data in accordance with the disclosed subject matter.

Referring to FIG. 6, a block diagram of a system 600 that facilitates managing data in accordance with an aspect of the disclosed subject matter is illustrated. In accordance with an aspect, the system 600 can be associated with the electronic communication of information associated with RSA cryptography, ECC, Diffie-Hellman cryptography, Digital Signature Algorithm (DSA) cryptography, and/or Elliptic Curve DSA cryptography, for example. In accordance with one aspect, system 600 can include a memory component 102, memory array 104, data management component 106, and host processor 212. The memory component 102, data management component 106, and processor component 212 each can be the same or similar as, and/or can comprise the same or similar functionality as, respective components as more fully described herein, for example, with regard to system 100, system 200, system 300, and/or system 400.

In one aspect, the memory array 104 can be partitioned into a desired number of partitions, and, for example, can include a general partition 602 and a secure partition 604. The general partition 602 can store and/or provide data, including data for which general access is desired. The secure partition 604 can store data for which a heightened level of security is desired. For example, the secure partition 604 can store information such as information associated with a private key(s) (e.g., secret key or data) of an entity (e.g., user) utilizing the electronic device.

It is to be appreciated that the memory component 102 can comprise, for example, volatile memory (e.g., SRAM) and/or nonvolatile memory (e.g., flash memory). The memory component 102 of the subject systems and methods is intended to comprise, without being limited to, these and any other suitable types of memory. In addition, it is to be appreciated that the memory component 102 can comprise a server, a database, a hard drive, and the like.

System 600 can include a host processor 212 that can be associated with a cryptographic component 606. The cryptographic component 606 can facilitate encrypting data being written to memory 604 and/or decrypting data being read from memory component 102, and/or can facilitate generating a digital signature associated with a user(s) and/or data. The cryptographic component 606 can provide symmetric cryptographic tools and accelerators (e.g., Twofish, Blowfish, AES, TDES, IDEA, CAST5, RC4, etc.) to facilitate securing data. Cryptographic component 606 can also provide asymmetric cryptographic accelerators and tools (e.g., RSA, Digital Signature Standard (DSS), and the like) to facilitate data security. Additionally, cryptographic component 606 can provide accelerators and tools (e.g., Secure Hash Algorithm (SHA) and its variants such as, for example, SHA-0, SHA-1, SHA-224, SHA-256, SHA-384, and SHA-512) to facilitate data security.

System 600 can further include an authentication component 608 that can solicit authentication data from an entity, and, upon the authentication data so solicited, can be employed, individually and/or in conjunction with information acquired and ascertained as a result of biometric modalities employed, to facilitate controlling access to the memory component 102. The authentication data can be in the form of a password (e.g., a sequence of humanly cognizable characters), a pass phrase (e.g., a sequence of alphanumeric characters that can be similar to a typical password but is conventionally of greater length and contains non-humanly cognizable characters in addition to humanly cognizable characters), a pass code (e.g., Personal Identification Number (PIN)), and the like, for example. Additionally and/or alternatively, public key infrastructure (PKI) data can also be employed by authentication component 608. PKI arrangements can provide for trusted third parties to vet, and affirm, entity identity through the use of public keys that typically can be certificates issued by the trusted third parties. Such arrangements can enable entities to be authenticated to each other, and to use information in certificates (e.g., public keys) and private keys, session keys, Traffic Encryption Keys (TEKs), cryptographic-system-specific keys, and/or other keys, to encrypt and decrypt messages communicated between entities.

The authentication component 608 can implement one or more machine-implemented techniques to identify an entity by its unique physical and behavioral characteristics and attributes. Biometric modalities that can be employed can include, for example, face recognition wherein measurements of key points on an entity's face can provide a unique pattern that can be associated with the entity, iris recognition that measures from the outer edge towards the pupil the patterns associated with the colored part of the eye—the iris—to detect unique features associated with an entity's iris, and finger print identification that scans the corrugated ridges of skin that are non-continuous and form a pattern that can provide distinguishing features to identify an entity.

Figure 7:
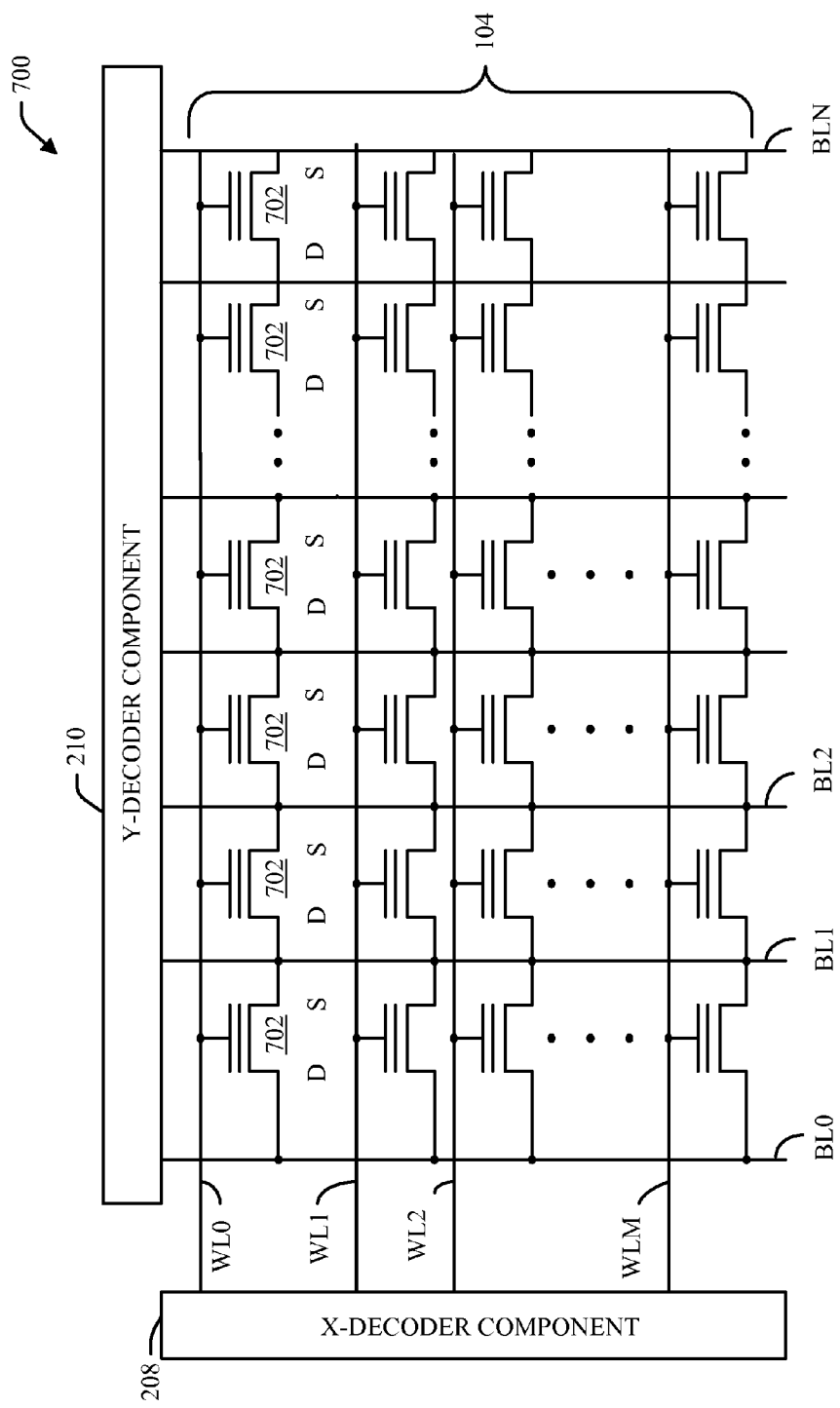
FIG. 7 depicts an example diagram of a memory array in accordance with the disclosed subject matter.

Turning to FIG. 7, depicted is an example diagram 700 of a memory array 104 that can be employed in a memory component 102 in accordance with the disclosed subject matter. The diagram 700 of the memory array 104 can include a plurality of memory cells 702 that each can be comprised of a drain, gate, and source. Each memory cell 702 can have one or more levels therein and can thereby store one or more bits of data therein, where each level can be associated with a bit of data. The memory array 104 can be included in a memory component 102 (not shown in its entirety). The memory array 104 can be associated with an X-decoder component 208 (e.g., WL decoder) and a Y-decoder component 210 (e.g., BL decoder) that can each respectively decode inputs/outputs during various operations (e.g., programming, reading, verifying, erasing) that can be performed in the memory cells 702. The X-decoder component 208 and Y-decoder component 210 can each receive address bus information from a host processor (e.g., 212), system controller 214, file management component 308 and/or search component 310 or the like, and can utilize such information to facilitate accessing or selecting the desired memory cell(s) (e.g., memory location(s)) associated with the command. The memory cells 702 can be formed in M rows and N columns. A common WL can be attached to the gate of each memory cell 702 in a row, such as word-lines WL0, WL1, WL2, through WLM. A common BL can be attached to each cell 702 in a column, such as bit-lines BL0, BL1, BL2, through BLN. A WL can contain, for example, 1024 elements forming multiple words and each sector in a memory array 104 can include, for example, 512 WLs to provide at least 512 k elements of memory. In accordance with an aspect of the disclosed subject matter, respective voltages can be applied to one or more cells 702 through the WLs and BLs to facilitate performing operations, such as program, read, erase, and the like.

FIGS. 8-13 illustrate methodologies and/or flow diagrams in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events.

Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 8:
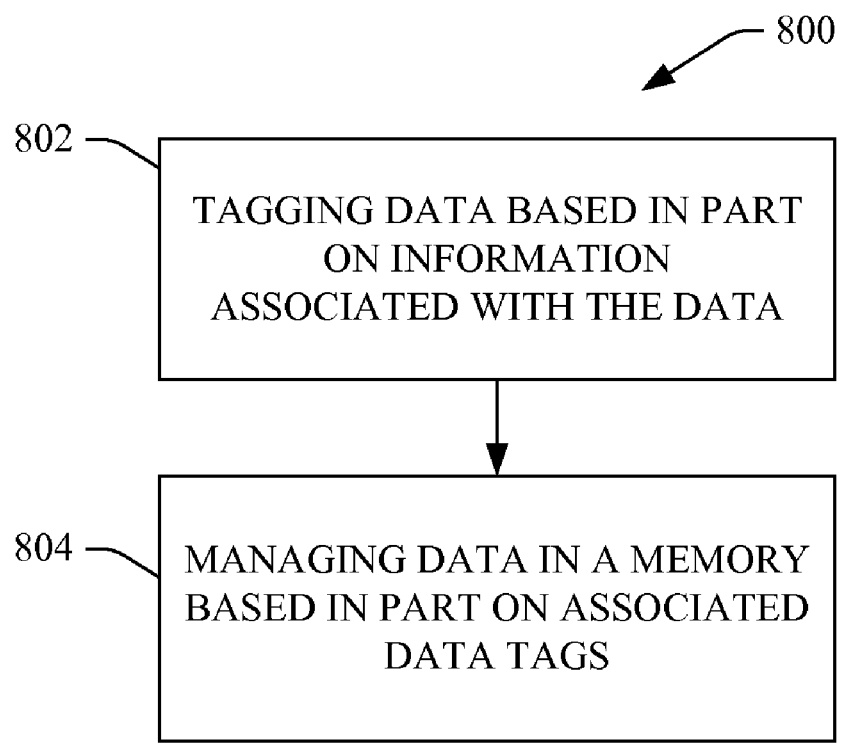
FIG. 8 depicts a methodology that can facilitate managing information in a memory in accordance with an aspect of the disclosed subject matter.

Referring to FIG. 8, a methodology 800 that can facilitate data management of a memory device (e.g., memory component 102) in accordance with the disclosed subject matter is illustrated. At 802, data can be tagged based in part on information associated with the data. In one aspect of tagging data, characteristics, including metadata, associated with the data can be logged. In one aspect, the data can be data being received and stored (e.g., written to) in a memory component 102. In another aspect, the data can be data present in a memory component 102 that is being updated and/or modified in content or placement in a memory array 104. In another aspect, logging can be performed with respect to data already stored in the memory component, for example, when the data is read. The characteristics of the data can relate to static as well as dynamic qualities of the data. In an aspect, a log component 302 can capture metadata related to the data entity, which can include static as well as dynamic metadata. Metadata can include information about the data such as, for example, types of data (e.g., pictures, music, text, spreadsheets, calendar or planning data, web pages, etc.), name and size of data, name of data file extension, sensitivity level of data, and date of creation. Metadata can also include information such as, for example, date of last read access and total number of read access to the data, date of last update (write) access and total number of write access to the data. In another aspect, a data management component 106 can contain an intelligent component 304, which can create metadata based in part on embedded rules and/or an inference engine. Such metadata can include, for example, sensitivity factors, applications utilizing the data, and relation of data to other data in terms proximity of use, time of use, and/or duration of use.

In an aspect, tagging of the data can include the characteristics of the data as logged and turned into tags that are associated with the actual data itself. In another aspect, tagging can also include the use of an intelligent component to analyze the data and infer properties that can also be captured as data tags.

At 804, the data in a memory can be managed based in part on the data tags associated with the data. In various aspects, management can relate to placement of the data in the memory array of a memory component, movement of the data in the memory array of a memory component, pre-fetching of the data in the memory array of a memory component, an erase of the data in the memory array of a memory component (e.g., erase of sensitive information), and/or control of file searches related to the data in the memory array of a memory component. In one aspect, management can pertain to file management and particular allocation of the data and data tags in the memory array. Allocating data that will tend to be used more often and more immediately to more physically sound areas of the memory structure can conserve those areas that have seen greater usage, thereby extending the life of the memory component. Another aspect of managing data by tags can be the placement of like files or files that are used together in contiguous or nearly contiguous physical location in the memory array. By utilizing the data tags, organization and construction of the page and books in a non-heterogeneous manner can provide increased efficiency, for example, for quicker prefetch operations. As an example, music data can be loaded into memory contiguously, where upon a read command, the contiguous data lends itself to a power boost mode. Yet another aspect of managing data on a memory device can be the smart application of wear leveling. Since the data tags capture information about the data and can include information relating sets of data to each other, wear leveling can be applied in a more judicious manner. Conventionally, wear leveling utilizes the entire available memory array, distributing the data as evenly as possible. This can lead to fragmentation and in the case of large files (e.g., picture files) a great deal of wasted time and movement.

In another aspect, other data that are similar in type can be managed differently based on expected use. As an example, a planning calendar function will not use upcoming event data and already expired event data in the same manner. The older data, which is not likely to be changed, can better be positioned in the memory array in areas that have less useful life remaining.

In another aspect, management can perform a direct search of data in the memory component. The use of tag data can provide for new functionality of the memory. In an aspect disclosed herein, the data tags can be utilized as a database index enabling a search function to be run directly in the memory and not be dependent on an exterior host processor.

Figure 9:
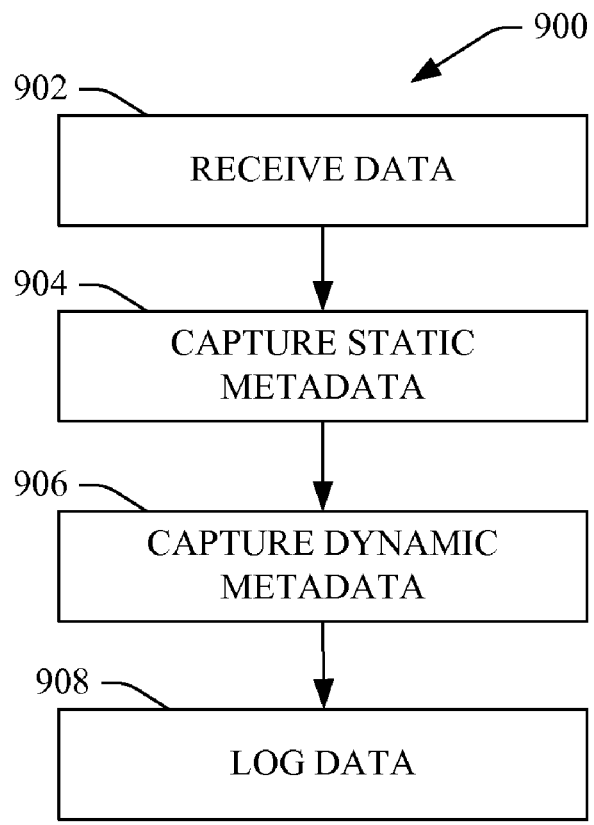
FIG. 9 illustrates a methodology that can facilitate data logging in accordance with an aspect of the disclosed subject matter.

Now referring to FIG. 9, illustrated is a methodology 900 that can facilitate managing data associated with a memory by capturing log data in accordance with an aspect of the disclosed subject matter. At 902, data can be received. In one aspect, data can be received by the memory component via a user interface (e.g., presentation component 218), where the user can input data utilizing the user interface. At 904, static metadata can be captured. Static metadata can include information about the data that is not likely to change, such as type of data (e.g., pictures, music, text, spreadsheets, web pages), name of the data, date of creation, size of the data, and other information characterizing the data. In one aspect, a log component (e.g., 302) can capture static metadata. At 906, dynamic metadata can be captured. Dynamic metadata can include information about the data that is likely to change, such as date of last read access to the data, date of last update (write) access to the data, number of read access to the data (how "hot" or "cold" the data are), number of write access to the data (e.g., how many times the data item has been revised) and which other data are typically accessed with these data. In an aspect, metadata associated with existing data (e.g., data stored in the memory component 102) can be logged and captured, for example, when such data is accessed (e.g., read, modified, etc.). In one aspect, a log component (e.g., 302) can capture dynamic metadata. In another aspect, the log component can utilize an intelligent component (e.g., 304) that can utilize rule based or inference based techniques to facilitate creating metadata. This metadata can be captured (e.g., by a log component based in part on information received from the intelligent component). At 908, the captured log data can be stored (e.g., in memory array 104).

Figure 10:
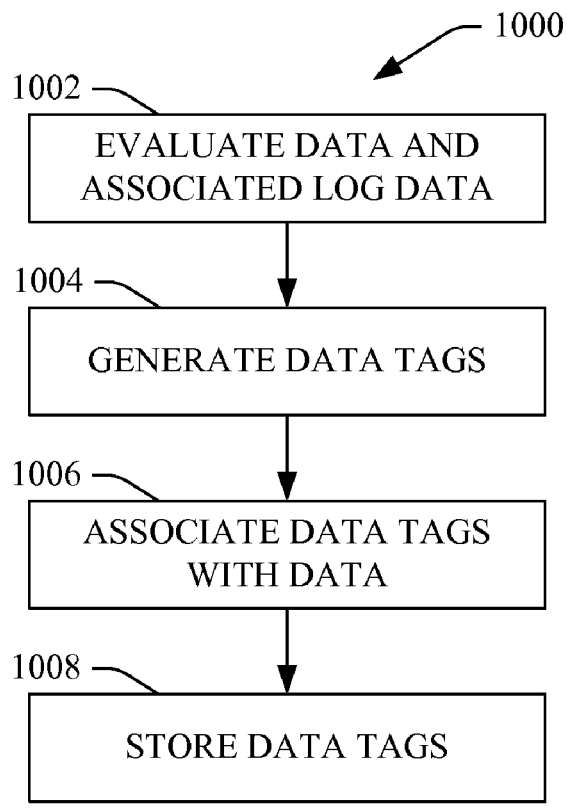
FIG. 10 illustrates a methodology that can facilitate data tagging in accordance with an aspect of the disclosed subject matter.

Turning now to FIG. 10, illustrated is a methodology 1000 that can facilitate managing the data in accordance with an aspect of the disclosed subject matter. At 1002, data and associated log data can be evaluated. In an aspect, a tag component 306 can utilize an intelligent component 304 to evaluate data and log data in part per prescribed rules and/or inference. At 1004, data tags can be generated based in part on the characteristics of the data and log data. At 1006, the generated data tags can be associated with the corresponding data. In an aspect, the data tags can be contiguous with the data and in another aspect, the data tags can be noncontiguous with the data, as desired. In yet another aspect, an index can be created that can associate the data tags with their respective data. At 1008, the data tags can be stored (e.g., in memory array 104).

Figure 11:
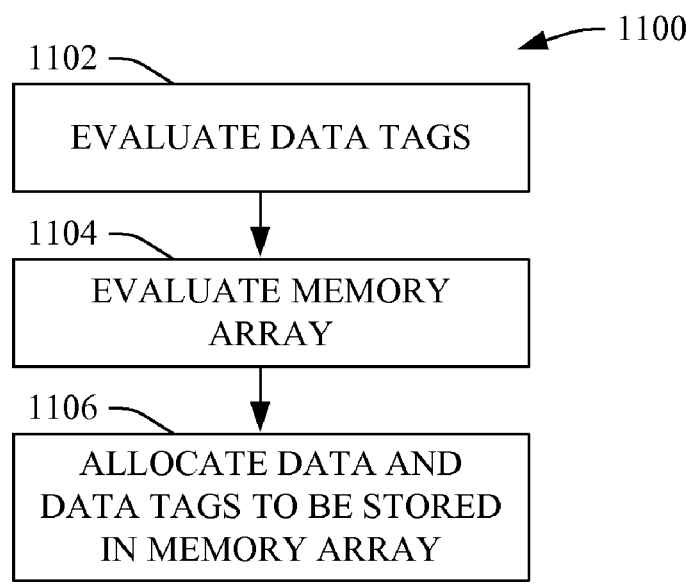
FIG. 11 illustrates a methodology that can facilitate file management in accordance with another embodiment of the disclosed subject matter.

FIG. 11 illustrates a methodology 1100 for managing data in accordance with aspects of the disclosed subject matter. At 1102, data and its corresponding data tags can be evaluated. At 1104, the memory array can be evaluated. In one aspect, a data management component 106 can evaluate a memory for locations that have seen considerable use and/or likelihood of increased errors. In another aspect, a data management component 106 can evaluate a memory for locations that have been exposed to less use. At 1106, allocations can be made for the placement of the data set (e.g., the data and the corresponding data tags) in the memory (e.g., memory array 104). In an aspect, evaluation of data, data tags and the memory array can follow prescribed rules and/or an intelligent component 304.

Figure 12:
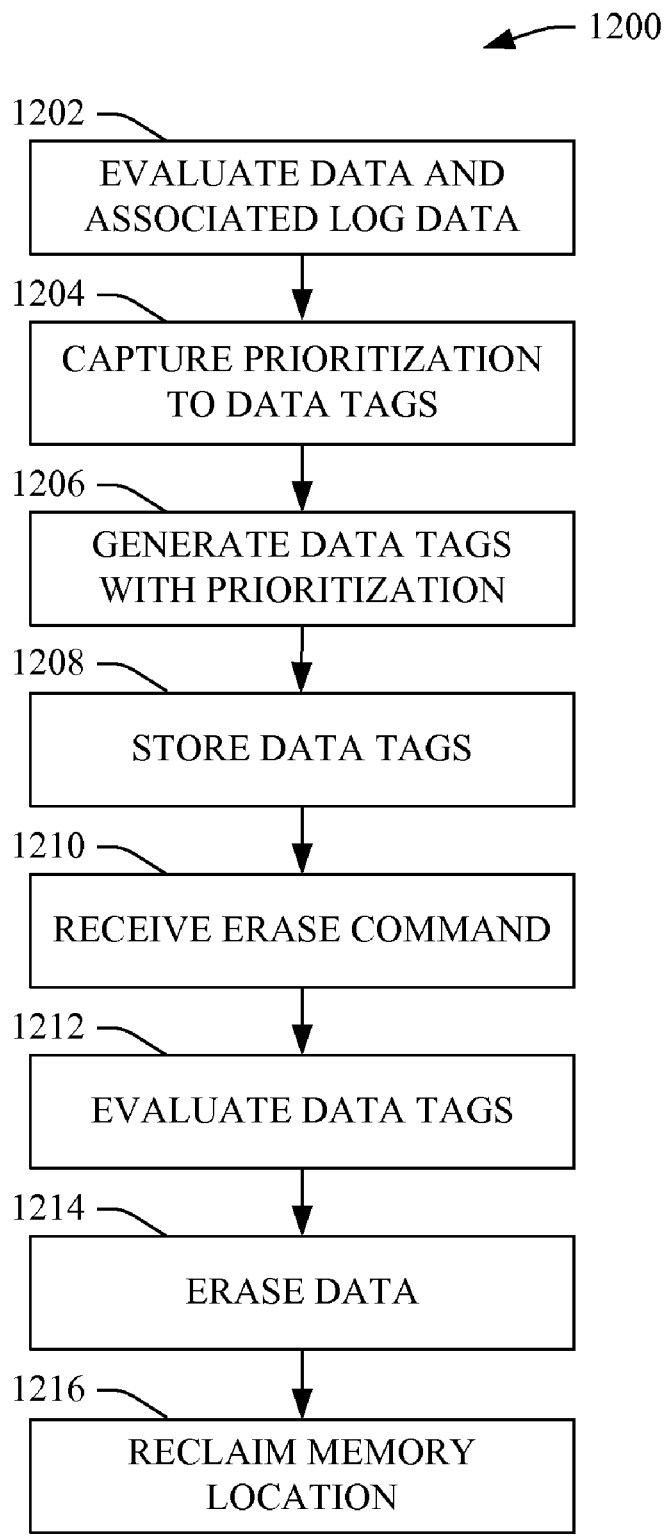
FIG. 12 illustrates a methodology that can facilitate managed erasure of data in accordance with an aspect of the disclosed subject matter.

FIG. 12 illustrates a methodology 1200 that can facilitate managed erasure of data in accordance with an aspect of the disclosed subject matter. At 1202, data and associated log data can be evaluated for sensitivity characteristics. In an aspect, a multitude of characteristics related to the data, including for example sensitivity characteristics, can be captured by a log component 302. Sensitivity characteristics can be based in part on predetermined sensitivity criteria, which can be based in part on such factors as cryptographic rules, a level(s) of authorization, a user specification and/or an association with particular applications, for example, or can be inferred (e.g., by an intelligent component).

In an aspect, a log component 302 can capture metadata related to the data entity, which can include static as well as dynamic metadata. Metadata can include information about the data such as, for example, types of data (e.g., pictures, music, text, spreadsheets, calendar or planning data, web pages, etc.), name and size of data, name of data file extension, sensitivity level of data, and date of creation. Metadata can also include information such as, for example, date of last read access and total number of read access to the data, date of last update (write) access and total number of write access to the data. In an embodiment, an intelligent component 304 can create metadata based in part on embedded rules and/or an inference engine. Such metadata can include, for example, sensitivity factors, applications utilizing the data, and relation of data to other data in terms proximity of use, time of use, and/or duration of use.

At 1204, prioritization of the data based on in part sensitivity characteristics of the data as indicated in the log data can be captured to facilitate creating a data tag(s). Based in part on the evaluation of the data, the data can be assigned a priority related to the level of sensitivity of the data. For example, certain confidential or personal information of a user can be determined to be sensitive data, and can be prioritized as such.

At 1206, one or more data tags can be created based in part on a predetermined sensitivity criteria. In an aspect, a data tag associated with the data can be created and/or modified to indicate a priority of the data when the data is determined to be sensitive information (e.g., confidential information of a user) based in part on predetermined sensitivity criteria. The data can be tagged as sensitive data such that, if the data is erased or deleted, complete erasure of the memory location to reclaim the erase block in which the memory location resides can be prioritized to facilitate an expedient and complete erasure of the memory location, and erase block, and reclaiming of such erase block, as opposed to simple deletion of the header information associated with the data, where the data can still reside in the memory location when deleted by a user. The data tags for data indicating both sensitive nature and indicating "write" availability (e.g., "marked "dirty") for the memory location can be automatically granted priority. In an aspect, tagging of the data can include the characteristics of the data as logged and turned into tags that are associated with the actual data itself. In another aspect, tagging can also include the use of an intelligent component 304 to analyze the data and infer properties that can also be captured as data tags. At 1208, the data tags can be stored. In an aspect, a file management component 308 can optimally store the data and the priority data tag(s) associated therewith.

At 1210, an erase command can be received. In an aspect, the host processor (e.g., 212) can generate and provide an erase command to erase the data, and the erase command can be received by the memory component 102. At 1212, the data tag(s) related to the data being designated for erasure can be evaluated for prioritization. At 1214, the data can be erased from the memory location. In one aspect, the data can still reside in the memory location even after an erase is performed, but the header information that facilitated locating the data in the memory can be deleted, so there is no information pointing to the data in the memory location. At 1216, the memory location (and erase block in which the memory location resides) related to the erased data can be reclaimed based in part on the data tag(s) (e.g., priority data tag).

In an aspect, the file management component 308 can facilitate erasing the data and reclaiming the erase block associated with the erased data expediently by prioritizing the reclaiming of the erase block based in part on the priority data tag, over other erase blocks that do not have a priority data tag. In contrast, conventionally, when a sensitive data item is desired to be erased, memory only marks the data as "dirty". Memory locations with items marked as "dirty" are not prioritized to be erased in a more timely matter than any other "dirty" memory location(s) in the memory array 104. As conventional wear leveling will direct which areas of the memory array 104 can be erased, the areas marked "dirty" that contain sensitive information are not distinguished from other areas designated as available and the sensitive data can persist albeit in a "dirty" marked state for considerable time.

Figure 13:
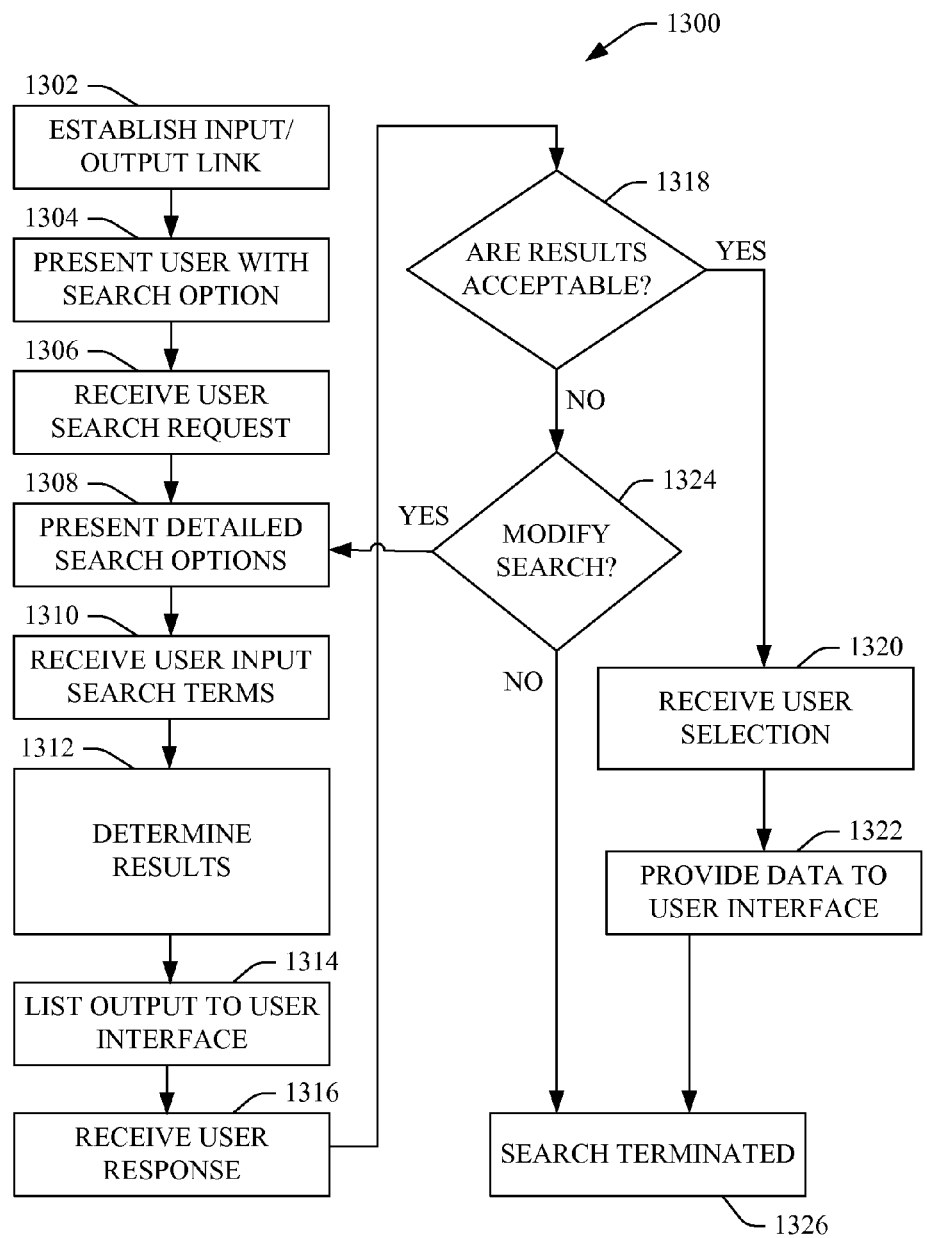
FIG. 13 depicts a methodology that can facilitate searching for information in a memory in accordance with an aspect of the disclosed subject matter.

FIG. 13 depicts a methodology 1300 that can facilitate searching for data associated with a memory in accordance with an aspect of the disclosed subject matter. At 1302, an input/output link can be established. In one aspect, an input/output link can be established between memory component 102 and a presentation component 218 through a host processor 212, such as is depicted in FIG. 2. At 1304, options to engage a search can be presented. At 1306, a user search request can be received (e.g., by the data management component 106 in memory component 102). At 1308, a set of detailed search options can be presented. In one aspect, search options can include file names, key words, or time frames. In another aspect, inferred characteristics related to the data that the user is searching for can be supplied. At 1310, receipt of user input search terms can be captured (e.g., through a presentation component). At 1312, search results can be determined. In one aspect, the search component can utilize the tags generated by the tag component to match the search terms and return results. In another aspect, search results can be obtained by utilizing an intelligent component in conjunction with the search component to retrieve a list of possible matches to the search inquiry. At 1314, the results of the search can be output (e.g., through an interface component to a host processor and/or presentation component). At 1316, receipt of user response to the output list can be captured. At 1318, information can be received regarding whether the search results are acceptable. If the results are acceptable, at 1320, information selecting a particular result selection can be received. At 1322, the data can be provided.

If, at 1318, the information received indicates that the search results are not acceptable, at 1324, information can be received regarding whether the search is to be modified. If the received information indicates that the search is to be modified, methodology 1300 can return to reference numeral 1308 and can proceed from that point. In one aspect, the search component can receive information indicating that the search is to be modified, for example, from user input received via the presentation component. If, at 1324, the received information indicates that the search is not being modified, the search can be canceled, and at 1326, the search can be terminated. Referring back to reference numeral 1322, after the data is provided at 1322, at 1326, the search can be terminated. At this point, methodology 1300 can end.

Figure 14:
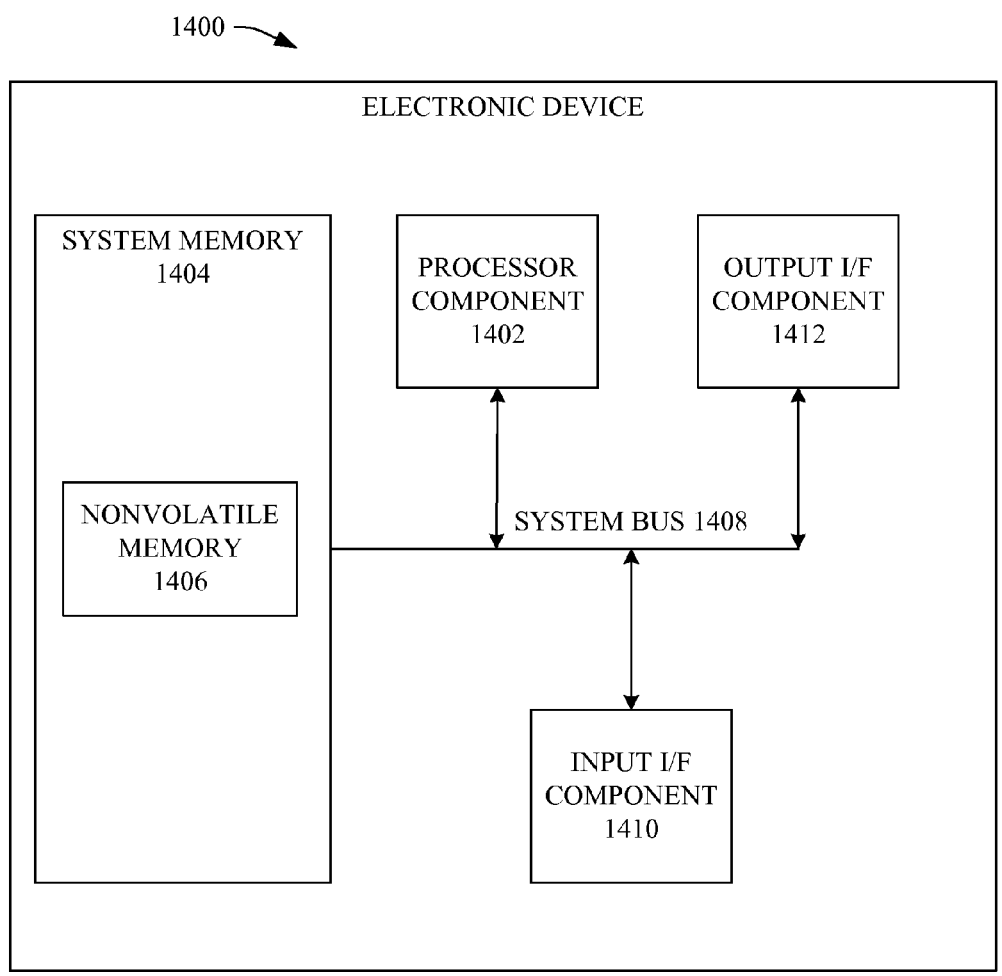
FIG. 14 illustrates an example of an electronic device that can be associated with a memory in accordance with an aspect of the disclosed subject matter.

Referring to FIG. 14, illustrated is a block diagram of an exemplary, non-limiting electronic device 1400 that can comprise and/or incorporate systems and methodologies as described herein (e.g., system 100, system 200, system 300, etc.), or a respective portion(s) thereof. The electronic device 1400 can include, but is not limited to, a computer, a laptop computer, network equipment (e.g., routers, access points), a media player and/or recorder (e.g., audio player and/or recorder, video player and/or recorder), a television, a smart card, a phone, a cellular phone, a smart phone, an electronic organizer, a PDA, a portable email reader, a digital camera, an electronic game (e.g., video game), an electronic device associated with digital rights management, a Personal Computer Memory Card International Association (PCMCIA) card, a trusted platform module (TPM), a Hardware Security Module (HSM), set-top boxes, a digital video recorder, a gaming console, a navigation system or device (e.g., global position satellite (GPS) system), a secure memory device with computational capabilities, a device with a tamper-resistant chip(s), an electronic device associated with an industrial control system, an embedded computer in a machine (e.g., an airplane, a copier, a motor vehicle, a microwave oven), and the like.

Components of the electronic device 1400 can include, but are not limited to, a processor component 1402, a system memory 1404, which can contain a nonvolatile memory 1406, and a system bus 1408 that can couple various system components including the system memory 1404 to the processor component 1402. The system bus 1408 can be any of several types of bus structures including a memory bus or memory controller, a peripheral bus, or a local bus using any of a variety of bus architectures.

Electronic device 1400 can typically include a variety of computer readable media. Computer readable media can be any available media that can be accessed by the electronic device 1400. By way of example, and not limitation, computer readable media can comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, nonvolatile memory 1406 (e.g., flash memory), or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by electronic device 1400. Communication media typically embodies computer readable instructions, data structures, program modules or other data in a modulated data signal such as a carrier wave or other transport mechanism and includes any information delivery media.

The system memory 1404 can include computer storage media in the form of volatile (e.g., SRAM) (not shown) and/or nonvolatile memory 1406 (e.g., flash memory). In accordance with one embodiment of the disclosed subject matter, the system memory 1404, or a portion thereof, can comprise, and/or can be the same or substantially similar to, and/or can comprise the same or substantially similar functionality as, the memory component 102 (e.g., as illustrated in FIGS. 1, 2, etc., and described herein). A basic input/output system (BIOS), containing the basic routines that can facilitate transferring information between elements within electronic device 1400, such as during start-up, can be stored in the system memory 1404. The system memory 1404 typically also can contain data and/or program modules that can be accessible to and/or presently be operated on by the processor component 1402. By way of example, and not limitation, the system memory 1404 can also include an operating system (s), application programs, other program modules, and program data.

The nonvolatile memory 1406 can be removable or non-removable. For example, the nonvolatile memory 1406 can be in the form of a removable memory card or a USB flash memory drive. In accordance with one aspect, the nonvolatile memory 1406 can include flash memory (e.g., single-bit flash memory, multi-bit flash memory), ROM, PROM, EPROM, EEPROM, or NVRAM (e.g., FeRAM), or a combination thereof, for example. Further, a flash memory can comprise NOR flash memory and/or NAND flash memory.

A user can enter commands and information into the electronic device 1400 through input devices (not shown) such as a keypad, microphone, tablet, or touch screen although other input devices can also be utilized. These and other input devices can be connected to the processor component 1402 through input interface component 1410 that can be connected to the system bus 1408. Other interface and bus structures, such as a parallel port, game port or a universal serial bus (USB) can also be utilized. A graphics subsystem (not shown) can also be connected to the system bus 1408. A display device (not shown) can be also connected to the system bus 1408 via an interface, such as output interface component 1412, which can in turn communicate with video memory. In addition to a display, the electronic device 1400 can also include other peripheral output devices such as speakers (not shown), which can be connected through output interface component 1412.

It is to be understood and appreciated that the computer-implemented programs and software can be implemented within a standard computer architecture. While some aspects of the disclosure have been described above in the general context of computer-executable instructions that may run on one or more computers, those skilled in the art will recognize that the technology also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices (e.g., PDA, phone, watch), microprocessor-based or programmable consumer electronics, and the like, each of which can be operatively coupled to one or more associated devices.

The illustrated aspects of the disclosure may also be practiced in distributed computing environments where certain tasks are performed by remote processing devices that are linked through a communications network. In a distributed computing environment, program modules can be located in both local and remote memory storage devices.

As utilized herein, terms "component," "system," "interface," and the like, are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the disclosed subject matter.

Some portions of the detailed description have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

What has been described above includes examples of aspects of the disclosed subject matter. It is, of course, not possible to describe every conceivable combination of components or methodologies for purposes of describing the disclosed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has," or "having," or variations thereof, are used in either the detailed description or the claims, such terms are intended to be inclusive in a manner similar to the term "comprising" as "comprising" is interpreted when employed as a transitional word in a claim.

What is claimed is:

1. A system that facilitates management of data in a memory, comprising:
    a memory that includes a plurality of memory locations, wherein at least one of data or one or more data tags, or a combination thereof, is written to, read from, or stored in, at least one memory location of the plurality of the memory locations; and
    a data management component that manages data associated with a memory based in part on information associated with the one or more data tags, wherein the one or more data tags include probability based inference information and a user specification regarding priority or sensitivity of the data utilized to infer prospective data management actions to be performed and sensitivity characteristics of the data, the sensitivity characteristics are based at least in part on levels of authorization and a user specification regarding priority of the data, the sensitivity characteristics are employed to prioritize the data for rapid deletion based on a similarity associated with the one or more data tags.

2. The system of claim 1, the memory is comprised of at least one of a NOR flash memory or a NAND flash memory, or a combination thereof.

3. The system of claim 1, further comprising a log component, wherein the log component captures log data associated with the data received for input in the memory, the nature of the log data being of at least static metadata, dynamic metadata, or a combination thereof.

4. The system of claim 3, further comprising a tag component, wherein the tag component captures log data in the one or more data tags, and the data tags are associated with the corresponding data that is to be or already has been placed in a memory.

5. The system of claim 4, further comprising an intelligent component, wherein the intelligent component creates metadata associated with the data, the one or more data tags, or a combination thereof, the intelligent component employs a machine learning based technique that includes use of a Hidden Markov Model (HMM) or a support vector machine (SVM) to create the metadata associated with the data.

6. The system of claim 5, wherein the tag component captures the metadata result of the intelligent component in the one or more data tags and associates the one or more data tags with the corresponding data.

7. The system of claim 1, wherein the data management component further comprises a file management component, wherein the file management component: allocates placement of data and data tags in a memory, and the allocation:
    pertains to characteristics of the data tags; and
    follows embedded rules, an intelligent component or a combination thereof.

8. The system of claim 7, wherein the file management component erases date from a memory, and the erasure of data pertains to:
    characteristics of the data tag; and
    follows embedded rules, an intelligent component or a combination thereof.

9. The system of claim 1, wherein the data management component further comprises:
    a search component, wherein the search component searches data in the memory based in part on data tag characteristics and input received from the user; and
    an interface component, wherein the interface component establishes an input/output link with a host processor, presents an option to search to the user, receives the user request to search and returns the results of the search to the user.

10. The system of claim 9, wherein the results of the search include one of at least a data list, an option to modify the search or an option to cancel the search.

11. An electronic device comprising the system of claim 1.

12. The electronic device of claim 11, wherein the electronic device is one of a computer, a cellular phone, a digital phone, a video device, a smart card, a personal digital assistant, a television, an electronic game, a digital camera, an electronic organizer, an audio player, an audio recorder, an electronic device associated with digital rights management, a Personal Computer Memory Card International Association (PCMCIA) card, a trusted platform module (TPM), an electronic control unit associated with motor vehicles, a global positioning satellite (GPS) unit, an electronic device associated with an airplane, an electronic device associated with an industrial control system, a Hardware Security Module (HSM), a set-top box, a secure memory device with computational capabilities, or an electronic device with a tamper-resistant chip.

13. A method that facilitates management of data in a memory, comprising:
    tagging data based in part on information associated with the data, the data is associated with the memory; and
    managing data in the memory based in part on data tags respectively associated with the data, wherein the data tags include probability based inference information and a user specification regarding priority or sensitivity of the data utilized to infer prospective data management actions to be performed, wherein based in part on a similarity associated with each of the data tags respectively associated with the data, the data tags are employed to ensure contiguity of the data.

14. The method of claim 13, further comprising:
    logging data wherein the log data comprise metadata of the nature of at least static, dynamic, or a combination thereof; and
    tagging the data based in part on the log data, wherein the tagging of the data is based in part on embedded rules, or an inference of a characteristic associated with the data, or a combination thereof.

15. The method of claim 13, wherein the data tags are associated with the corresponding data that is to be or already has been stored in a memory.

16. The method of claim 13, further comprising:
    evaluating the memory;

evaluating the data and data tags associated with the data; and allocating the storage location in the memory of the data and associated data tags based in part on characteristics of the data tags.

17. The method of claim 13, wherein the evaluating of the data and data tags associated with the data utilizes embedded rules, an intelligent component or a combination thereof.

18. The method of claim 13, further comprising:
capturing sensitivity prioritization to one or more data tags;
receiving a command to erase data in a memory component;
evaluating the one or more data tags associated with the data to be erased;
erasing the data; and
reclaiming the memory location associated with the data based in part on the prioritization specified in the one or more data tags associated with the data.

19. The method of claim 18, wherein the capturing of prioritization is based in part on a predetermined sensitivity criteria, the predetermined sensitivity criteria is related to at least one of cryptographic rules, a level(s) of authorization, an association of the data with a particular application(s), or inferred priority or sensitivity of the data, or a combination thereof.

20. The method of claim 13, further comprising performing search of the data in the memory based in part on data tag characteristics, and the search comprises:
establishing an input/output link with a host processor;
presenting an option to search to the user;
receiving the user request to search;
presenting detailed search options to the user;
receiving user search terms;
querying the memory using search terms;
retrieving data list;
providing list to user;
accepting one of a user selection of data from the data list, a request to modify the search or a request to cancel the search; and
providing data to user based on user selection of data or providing search options based on request to modify search or terminating search based on request to cancel the search.

* * * * *